United States Patent

Catena et al.

[11] Patent Number: 5,658,968
[45] Date of Patent: Aug. 19, 1997

[54] FLEXIBLE PACKAGING PRINTING INK

[75] Inventors: Robert J. Catena, Belleville; Mathew C. Mathew, Bloomfield; Sonia E. Barreto, Belleville; Nicholas Marinelli, Jersey City, all of N.J.

[73] Assignee: Sun Chemical Corporation, Fort Lee, N.J.

[21] Appl. No.: 762,220

[22] Filed: Dec. 9, 1996

[51] Int. Cl.$^6$ .................................................. C09D 5/00
[52] U.S. Cl. ............................. 523/161; 524/31; 524/270
[58] Field of Search ........................... 523/161; 524/31, 524/270

[56] References Cited

U.S. PATENT DOCUMENTS

| | | | |
|---|---|---|---|
| 4,385,166 | 5/1983 | Carlick et al. | 528/111.3 |
| 4,490,430 | 12/1984 | Findlay et al. | 428/217 |
| 4,810,747 | 3/1989 | Bornack, Jr. et al. | 524/538 |
| 4,894,433 | 1/1990 | Bornack, Jr. et al. | 528/272 |
| 4,895,888 | 1/1990 | Keaveney | 524/391 |
| 4,973,617 | 11/1990 | Incontro et al. | 524/187 |
| 4,980,408 | 12/1990 | Chan | 524/504 |
| 5,183,847 | 2/1993 | El-Hefnawi et al. | 525/54.44 |
| 5,338,785 | 8/1994 | Catena et al. | 524/39 |

*Primary Examiner*—Edward J. Cain
*Attorney, Agent, or Firm*—Sidney Persley

[57] ABSTRACT

An improved flexible packaging ink comprising a polyamide resin prepared by condensing a dibasic acid mixture with a diamine mixture, a pigment, nitrocellulose and a solvent, wherein the improvement comprises, a polyamide resin containing a monobasic acid and adding a dimerized rosin.

16 Claims, No Drawings

FLEXIBLE PACKAGING PRINTING INK

FIELD OF THE INVENTION

This invention relates to a flexible packaging printing ink formulation comprising a polyamide resin prepared by condensing a dibasic acid mixture that contains a monobasic acid with a diamine mixture, a dimerized rosin, a pigment, a solvent and nitrocellulose.

BACKGROUND OF THE INVENTION

Flexible packaging printing inks are typically printed by rotary letterpress printing using flexible rubber plates or by gravure printing using engraved chrome-plated cylinders on a wide variety of substrates, e.g. plastic films such as cellulose acetate, polyethylene, polyethylene terephthalate, polyesters, polystyrene, cellophane; glassine, tissue, aluminum foils, liners, bags, paper labels, box coverings, gift wrappings, etc.

Solvent-borne flexible packaging printing inks are widely used in the graphic arts industry. They offer economy, versatility, quality and simplicity and permit a roll of material to be multi-color printed in a continuous web at speeds of over 300 meters per minute and fed directly to converting machines for slitting, forming or laminating. However, these inks must be carefully formulated in order to insure high bond strength and block resistance. In addition, solvent-borne flexible packaging inks are generally not receptive to water-borne primers or adhesives.

Blocking is a problem which typically occurs when printing on non-absorbent substrates and manifests itself as a sticking or transfer of the image to the underside of the web. Adhesion of the ink to the substrate is a particularly difficult problem to resolve in the case of non-absorbent substrates such as flexible packaging. With paper printing, there is usually no problem of adhesion since the ink is able to penetrate the paper and thus "grab" the surface. However, in the case of non-absorbent substrates, adhesion is affected by chemical and physical bonds. Wetting between the surface of the substrate and the ink is also of paramount importance.

A unique problem faced by solvent-borne flexible packaging inks is that they are ordinarily not receptive to water-borne primers and adhesives, which printers and packagers now prefer. It was necessary to use an ink/primer/adhesive system which was either entirely solvent-borne or water-borne. This has prevented the widespread use of solvent-borne flexible packaging inks in conjunction with water-borne primers and adhesives. Moreover, prior art inks containing resins such as shellac, nitrocellulose, ethyl cellulose, cellulose acetate propionate, conventional polyamide resins, acrylic and methacrylic resins, ketone resins, polyvinyl chloride, etc., have been found to have less than desirable adhesive bond strength, extrusion bond strength and block resistance.

U.S. Pat. No. 5,338,783, for example, teaches a solvent-borne flexible packaging printing ink formulated from a polyamide resin, pigment, solvent and cellulose acetate butyrate. While water is mentioned in a few of the examples as an ingredient of the ink formulation, it is present solely as a rheology stabilizer. In addition, the weight average molecular weight of the polyamide resin is considerably high.

The inks of the present invention overcome the above printing problems due to a unique formulation comprised of a polyamide resin, containing a monobasic acid; a dimerized rosin; a pigment, nitrocellulose and a solvent. The flexible packaging printing ink of the present invention offer much improved adhesive bond and extrusion bond strength, block resistance and increased water-borne primer compatibility.

SUMMARY OF INVENTION

The invention is an improved flexible packaging printing ink comprised of a polyamide resin, prepared by condensing a diamine mixture with a dibasic acid mixture; a pigment; nitrocellulose and a solvent; wherein the improvement comprises a polyamide resin containing a monobasic acid and adding a dimerized rosin.

DETAILS OF THE INVENTION

The polyamide resins employed in the flexible packaging printing inks of the present invention are prepared by condensing a dibasic acid mixture with a diamine mixture. The polyamide resins will have a weight average molecular weight in the range of about 8,000 to about 12,000.

The dibasic acid mixture typically comprises: (i) a $C_{20}$–$C_{44}$ dibasic acid mix of 80–100 dimers, 0–20% trimers and 0–5% monomers, added in a range of about 0.5–0.8 equivalents, preferably 0.7–0.8 equivalents. Examples of suitable $C_{20}$–$C_{44}$ dibasic acid mixtures include soya-derived and tall oil-derived fatty acids, preferably dimers, trimers and monomers of a $C_{36}$ dibasic acid. For a detailed description of dimer acids as used herein see *The Dimer Acids*, E. C. Leonard, Humko Sheffield (1975); and (ii) a $C_6$–$C_{12}$ dibasic acid, added in a range of about 0.1–0.3 equivalents, preferably 0.10–0.20 equivalents. Examples of suitable $C_6$–$C_{12}$ dibasic acids include adipic, pimelic, suberic, azelaic, sebacic, etc. Preferably, the $C_6$–$C_{12}$ dibasic acid is azelaic acid.

We have surprisingly found that it is advantageous to add a monobasic acid to the dibasic acid mixture of the polyamide resin. The monobasic acid is preferably a $C_1$–$C_4$ monobasic acid and is added in a range of about 0.1–0.3 equivalents, preferably 0.10–0.20 equivalents. Examples of suitable $C_1$–$C_4$ monobasic acids include formic, acetic, n-propionic, n-butyric, etc. Preferably, the $C_1$–$C_4$ monobasic acid is n-propionic acid.

The diamine mixture is a $C_2$–$C_5$ or $C_6$–$C_{12}$ alkyl diamine and is added in a range of about 0.5–0.8 equivalents ($C_2$–$C_5$ alkyl diamine) and 0.3–0.6 equivalents ($C_6$–$C_{12}$ alkyl diamine). Examples of suitable $C_2$–$C_5$ alkyl diamines include ethylenediamine, 1,2-diaminopropane, 1,4-diaminobutane, 1,5-diamino-pentane, etc. Examples of suitable $C_6$–$C_{12}$ alkyl diamines include 1,6-diamino hexane, 1,7-diaminoheptane, 1,8-diaminooctane, 1,10-diaminodecane, 1,12-diaminododecane, etc. The preferred diamine mixture comprises ethylenediamine, in about 0.6 equivalents, and hexamethylenediamine in about 0.4 equivalents. We have also surprisingly found that it is advantageous to add a dimerized rosin to the ink formulation, in conjunction with adding a monobasic acid to the polyamide resin. Without being bound by theory, it is believed that when added to the ink formulation, these components improve the adhesive bond strength, extrusion bond strength, block resistance and solvent retention of the formulated ink and increase its water-borne primer compatibility. Dimerized rosins are available commercially and may be obtained from pine trees. Such rosins are amber in color and have a melting point of about 60° C. (capillary method); their saponification value is 172 and acid value is 168–172. Preferably the rosin consists of approximately 90% acids (principally abietic acid) and 10% neutral materials. Rosin, typically a monomeric material, has a level of unsaturation which makes it possible for it to undergo polymerization to the dimer stage by heating the rosin with a suitable catalyst such as, for example, $BF_3$ etherate. A dimerized rosin product has a higher softening point, typically 150°–170° C., and a lower acid number, typically 140–150. An example of a preferred dimerized rosin suitable for use in the present invention is Dymerex® Resin (commercially available from Hercules Incorporated). Dymerex® is a thermoplastic resin composed primarily of dimeric acids derived from rosin with lesser amounts of monomeric resin acids and neutral materials of rosin origin. It has a softening point of 150° C., an acid number of 145 and a saponification number of 145.

Pigments suitable for use in the present invention are those typically used in flexographic printing inks such as monoazo yellows (PY 3, 5, 98); diarylide yellows (PY 12, 13, 14); Pyrazolone Orange, Permanent Red 2G, Lithol Rubine 4B, Rubine 2B, Red Lake C, Lithol Red, Permanent Red R, Phthalocyanine Green, Phthalocyanine Blue, Permanent Violet, titanium dioxide, carbon black, etc.

The nitrocellulose used herein is commercially available and preferably has a nitrogen content of about 11 to 11.5 percent and is of a grade known as "SS" (spirit-soluble).

The solvent may be selected from $C_1$–$C_4$ straight or branched chain alkanols, $C_2$–$C_4$ fatty acid acetates or mixtures thereof. Suitable $C_1$–$C_4$ alkanols include methanol, ethanol, n-propanol, isopropanol, n-butanol, etc. Suitable $C_2$–$C_4$ fatty acid acetates include ethyl acetate, n-propyl acetate, n-butyl acetate, etc. A preferred solvent is a mixture of n-propyl alcohol and n-propyl acetate, preferably in a corresponding weight ratio of 80-95:20-5.

This invention may be better understood by reference to the following illustrative examples which are not intended to limit the scope thereof in any respect and should not be so construed. Unless otherwise indicated, all parts and percentages are on a weight basis.

EXAMPLE 1

Resin Synthesis

A reaction mixture of 79.0% polymerized fatty acid, Empol 1061 Dimer Acid (consisting of 96% $C_{36}$ dimer acid, 2% monomeric acid and 2% polybasic acid and having an acid value of 193–201 and a specific gravity of 0.950 @ 25° C. and 760 mm Hg, commercially available from the Henkel Corporation), 3.3% azelaic acid and 2.6% n-propionic acid was prepared, agitated and heated to 80° C. Thereafter, a mixture of 6.2% ethylene diamine and 8.9% hexamethylenediamine (90% water) were added over a 1 hour period. This mixture was heated to 115° C. and held at such temperature for 1 hour. Thereafter, the temperature was increased to 200° C.; at 135° C., water evolution began. The reaction mixture was held at 200° C. for several hours until the acid and amine values were in the range of 1–4, as verified by titration. Thereafter, the temperature was gradually reduced, while adding n-propanol over a period of 90 minutes. The reaction mixture was maintained at 90° C. for 30 minutes, cooled to 45° C., and discharged. The resultant polyamide resin had a total non-volatile (TNV) content of 39% to 41% and a Brookfield viscosity of 300–500 cps @25° C.

EXAMPLE 2

Ink Preparation

A letdown varnish was prepared by mixing the following ingredients for 15–20 minutes:

| Component | Parts |
| --- | --- |
| Polyamide resin of Example 1 | 71.50 |
| Dymerex ® | 14.00 |
| n-Propanol | 10.50 |
| Ethanol | 4.00 |
| | 100.00 |

The final ink was prepared by mixing the following ingredients for 3–5 minutes:

| Component | Parts |
| --- | --- |
| letdown Varnish | 40.00 |
| Nitrocellulose Phthalo Blue Base | 60.00 |
| (8.5% SS nitrocellulose and 23% phthalocyanine blue pigment) | 100.00 |

EXAMPLE 3 (COMPARATIVE)

Example 2 was repeated except, instead of the polyamide resin of Example 1, 28.6 parts of an alcohol soluble polyamide resin, Unirez 2221, (having a ring-and-ball softening point of 105° C., acid number of 3, an amine number of 2, Brookfield melt viscosity of 290 cps @ 145° C., commercially available from the Union Camp Company) was used along with an additional amount of n-propanol (in order to yield the same polyamide content for the ink). A comparison of the ink properties of Examples 2 and 3 is set forth in Table 1:

TABLE 1

| Property | Example 2 | Example 3 |
| --- | --- | --- |
| Alcohol Resolubility | Excellent | Fair |
| Extrusion Bond Strength with Polyethyleneimine Primer measured on Commercial Polypropylene Films("D" signifies decalendering) | | |
| Film T523 | 287–293D | 64–75D |
| Film LCM-W | 289–318D | 84–104D |
| Film SPW | 196 | 106 |
| Adhesion Bond Strength(water borne) Note - "AF" signifies adhesive failure | | |
| Film T523 | 295–314AF | 200–250AF |
| Film LCM-W | 283–326AF | 148–150 |
| Film SPW | 174–200AF | 205–226 |
| Block Resistance (50 psi/49° C./16 hours/80% rel. hum.) | | |
| Film T523 | no cling, no pick | light block |
| Film LCM-W | no cling, no pick | no cling, no pick |
| Film SPW | no cling, no pick | no cling, no pick |
| Tape Adhesion (610 "Scotch" tape) | excellent | excellent |

In comparing an ink containing a typical solvent-borne polyamide resin to the ink of the present invention, the solvent-borne polyamide resin lacks receptability to the water-borne primer or adhesive, which results in significantly lower bond strengths in most cases.

EXAMPLE 4

The letdown varnish of Example 2 was combined with a nitrocellulose black base to yield the final ink. The resulting ink properties are set forth in Table 2.

EXAMPLE 5 (COMPARATIVE)

Example 2 was repeated except a nitrocellulose black base was used. A comparison of the ink properties of Examples 4 and 5 is set forth in Table 2:

TABLE 2

| Property | Example 4 | Example 5 |
| --- | --- | --- |
| Alcohol Resolubility | Excellent | Fair |
| Extrusion Bond Strength with Polyethyleneimine primer measured on Commercial Polypropylene Films Note - "D" signifies decalendering and "S" signifies split | | |
| Film T523 | 330–390D | 34–42D |
| Film LCM-W | 326–342D | 149–151D |
| Film SPW | 253–275s | 71–117 |
| Adhesion Bond Strength (water borne) Note - "AF" signifies adhesive failure and "FT" signifies film tear) | | |
| Film T523 | 235–264AF | 185–201S |
| Film LCM-W | 312FT | 231–238S |
| Film SPW | 146–167AF | 139–140AF |
| Block Resistance (50 psi/49° C./16 hours/80% rel. hum.) | | |
| Film T523 | no cling, no pick | block |
| Film LCM-W | cling, no pick | light block |
| Film SPW | no cling, no pick | no cling, no pick |
| Tape Adhesion (610 "Scotch" tape) | excellent | excellent |

EXAMPLE 6

An ink formulation was prepared by mixing the following ingredients for 30 minutes in order to properly solubilize the resins and disperse the pigment.

| Ingredient | Parts |
| --- | --- |
| Polyamide resin of Example 1 | 25.0 |
| Dymerex | 6.0 |
| Titanium Dioxide | 50.0 |
| n-Propanol | 19.0 |
| | 100.0 |

EXAMPLE 7 (COMPARATIVE)

An ink formulation was prepared by mixing the following ingredients for 30 minutes in order to properly solubilize the resins and disperse the pigment.

| Ingredient | Parts |
| --- | --- |
| Unirez 2221 | 10.0 |
| Dymerex | 6.0 |
| Titanium Dioxide | 50.0 |
| n-Propanol | 34.0 |
| | 100.0 |

A comparison of the ink properties of Examples 6 and 7 is set forth in Table 3:

TABLE 3

| Property | Example 6 | Example 7 |
| --- | --- | --- |
| Alcohol Resolubility | Excellent | Fair |
| Extrusion Bond Strength with Polyethyleneimine primer measured on Commercial Polypropylene Films | | |
| Film T523 | 199–257 | 78–93 |
| Film LCM-W | 140–173 | 64 |
| Film SPW | 150–170 | 71–77 |
| Adhesion Bond Strength (water borne adhesive) | | |
| Film T523 | 199–218 | 123–136 |
| Film LCM-W | 200 | 150–170 |
| Film SPW | 167 | 40–98 |
| Block Resistance (50 psi/49° C./16 hours/80% rel. hum.) | | |
| Film T523 | no cling, no pick | no cling, no pick |
| Film LCM-W | no cling, no pick | no cling, no pick |
| Film SPW | no cling, no pick | no cling, no pick |
| Tape Adhesion (610 "Scotch" tape) | excellent | excellent |

EXAMPLE 8 (COMPARATIVE)

Resin Synthesis

A reaction mixture of 81.4% polymerized fatty acid, Empol 1061 Dimer Acid (consisting of 96% $C_{36}$ dimer acid, 2% monomeric acid and 2% polybasic acid and having an acid value of 193–201 and a specific gravity of 0.950 @ 25° C. and 760 mmHg, commercially available from the Henkel Corporation), 3.4% azelaic acid and 2.6% n-propionic acid was prepared, agitated and heated to 80° C. Thereafter, a mixture of 6.4% ethylene diamine and 6.2% piperazine were added over a 1 hour period. This mixture was heated to 115° C. and held at such temperature for 1 hour. Thereafter, the temperature was increased to 200 ° C.; at 135° C., water evolution began. The reaction mixture was held at 200° C. for several hours until the acid and amine values were in the range of 1–4, as verified by titration. Thereafter, the temperature was gradually reduced, while adding n-propanol over a period of 90 minutes. The reaction mixture was maintained at 90° C. for 30 minutes, cooled to 45° C., and discharged. The resultant polyamide resin had a TNV content of 39% to 41% and a Brookfield viscosity of 300–500 cps @ 25° C.

EXAMPLE 9 (COMPARATIVE)

Ink Preparation

A letdown varnish was prepared by mixing the following ingredients for 15–20 minutes:

| Component | Parts |
| --- | --- |
| Polyamide resin of Example 8 | 71.50 |
| Dymerex ® | 14.00 |
| n Propanol | 10.50 |
| Ethanol | 4.00 |
| | 100.00 |

The final ink was prepared by mixing the following ingredients for 3–5 minutes:

| Component | Parts |
| --- | --- |
| letdown Varnish | 40.00 |
| Nitrocellulose Phthalo Blue Base | 60.00 |
| | 100.00 |

The resulting ink was unstable.

The present invention has been described in detail, including the preferred embodiments thereof. However, it will be appreciated that those skilled in the art, upon consideration of the present disclosure, may make modifications and/or improvements on this invention as set forth in the following claims.

What is claimed is:

1. An improved flexible packaging printing ink having (a) a polyamide resin, prepared by condensing a diamine mixture with a dibasic acid mixture; (b) a pigment; (c) nitrocellulose and (d) a solvent; wherein the improvement comprises: a polyamide resin containing a monobasic acid and adding (e) a dimerized rosin.

2. The ink of claim 1 wherein the dibasic acid mixture comprises $C_{20}$–$C_{44}$ dibasic acid dimers, trimers and monomers.

3. The ink of claim 2 wherein the dibasic acid mixture comprises $C_{36}$ dibasic acid dimers, trimers and monomers.

4. The ink of claim 1 wherein the dibasic acid mixture comprises $C_6$–$C_{12}$ dibasic acids.

5. The ink of claim 4 wherein the $C_6$–$C_{12}$ dibasic acids is azelaic acid.

6. The ink of claim 1 wherein the monobasic acid is a $C_1$–$C_4$ monobasic acid.

7. The ink of claim 1 herein the monobasic acid is n-propionic acid.

8. The ink of claim 1 wherein the diamine mixture comprises 0.6 equivalents of ethylene diamine and 0.4 equivalents of hexamethylenediamine.

9. The ink of claim 1 wherein the polyamide resin is present in an amount of about 7–25 wt. percent.

10. The ink of claim 1 wherein the dimerized rosin is present in an amount of about 2–15 wt. percent.

11. The ink of claim 1 wherein the pigment is present in an amount of about 10–55 wt. percent.

12. The ink of claim 1 wherein the nitrocellulose is present in an amount of about 3–10 wt. percent.

13. The ink of claim 12 wherein the solvent is selected from $C_2$–$C_4$ straight or branched chain alkanols; $C_2$–$C_4$ fatty acid acetates; or mixtures thereof.

14. The ink of claim 13 wherein the solvent is a mixture of n-propanol and n-propyl acetate.

15. The ink of claim 1 wherein the solvent is present in an amount of about 30–60 wt. percent.

16. The ink of claim 1 wherein the polyamide resin has a weight average molecular weight of about 8,000 to about 12,000.

\* \* \* \* \*